Oct. 6, 1953   C. C. PETERSEN   2,654,862
CELL FOR ELECTRICAL MEASUREMENT OF LIQUID DIELECTRICS
Filed Aug. 2, 1951
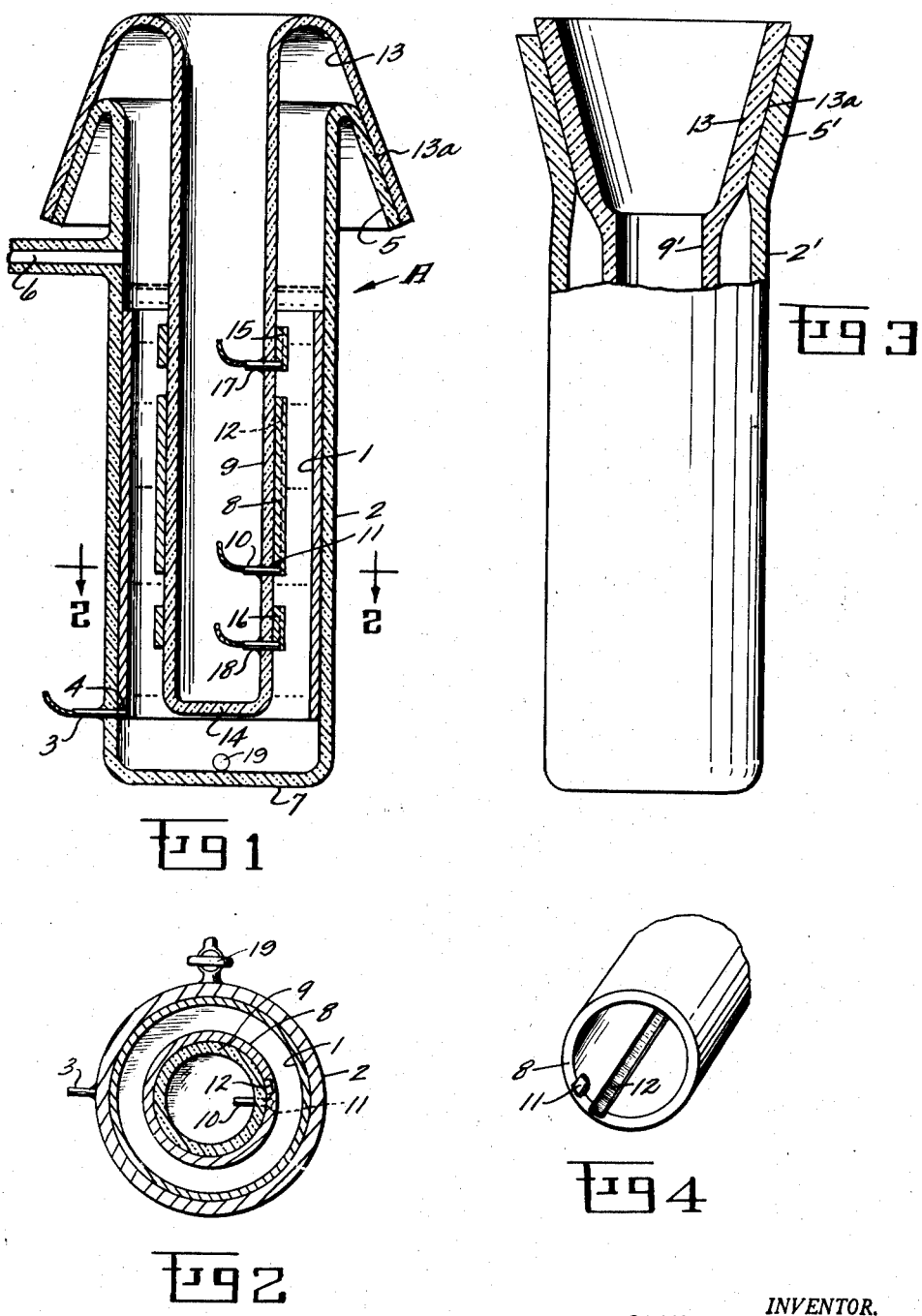
INVENTOR.
CLIFFORD C. PETERSEN Patented Oct. 6, 1953

2,654,862

UNITED STATES PATENT OFFICE 2,654,862

CELL FOR ELECTRICAL MEASUREMENT OF LIQUID DIELECTRICS

Clifford C. Petersen, Chicago, Ill., assignor, by mesne assignments, to the United States of America as represented by the Secretary of the Air Force Application August 2, 1951, Serial No. 239,990

6 Claims. (Cl. 324—30)

This invention relates to apparatus for electrical measurement of liquid dielectrics and more particularly it relates to cells commonly used for measuring dielectric constant, dissipation factor and resistivity of liquids.

Cells commonly used for measuring dielectric constant, dissipation factor and resistivity of liquids are of cylindrical form, comprising two or more conducting cylindrical electrodes insulated from each other. The liquid to be measured is introduced into the cell and forms the medium between the conducting cylinders.

The object of the present invention is to provide a rigid supporting arrangement for the conducting cylindrical electrodes. An additional object of this invention is to provide a gas-tight enclosure for the liquid being measured for the purpose of eliminating losses due to evaporation.

Another object of this invention is to provide a cell for measuring electrical characteristics of liquids which will facilitate disassembly for thorough cleaning.

A further object of this invention is to provide a cell which is particularly adapted for measuring the electrical characteristics of liquids which may be kept at a predetermined temperature or wherein the liquid temperature may be varied over a desired range.

Other objects and advantages of the present invention will be apparent from the following detailed description taken in conjunction with the drawings wherein:

Figure 1 is a sectional view of a test cell assembly constructed in accordance with one embodiment of this invention.

Figure 2 is a cross-sectional view taken on lines 2—2 of Figure 1.

Figure 3 is a plan view, partly in section, showing the details of a modification in which the inner and outer cylinders may be joined.

Figure 4 is a fragmentary view showing the electrode groove and notch.

Referring now to the drawings and particularly to Figure 1 thereof it will be seen that the cylindrical electrode 1, preferably made of nickel Monel or other corrosion-resistant conducting material, is snugly fitted on the interior wall of an open ended cylindrical supporting member 2 and is arrested from further movement downward in the cylinder by terminal pin 3, preferably made of tungsten, which fits into notch 4 of electrode 1. The cylinder 2 which is preferably made of Pyrex glass or other suitable insulating material is provided with a frustro-conical turned back portion 5, the purpose of which is to be described later, and is further provided with suitable means such as passage 6 whereby the liquid to be tested may be introduced into the cell generally indicated as at A, and with suitable means for draining the cells as at 19. The cylinder 2 is closed at the bottom end by end portion 7. With the construction thus far described it will be apparent that the electrode 1 may be removed from the cylinder 2 by merely sliding it longitudinally in the cylinder and thus facilitate its cleaning.

The electrode 8 is snugly fitted on the exterior of cylindrical supporting member 9 and is arrested from further downward movement by tungsten terminal pin 10 which is securely fastened to cylinder 9 and which removably fits into notch 11. The electrode 8 is further provided with a groove 12 as more clearly shown in Figures 2 and 4. The purpose of the groove 12 is to permit the electrode 8 to be moved longitudinally on the wall of cylinder 9 when the groove is positioned in line with the terminal pin 10. The cylinder 9 is further provided with a frustro-conical turned back portion 13, the purpose of which is to be described later, and the cylinder is closed at the bottom end by end portion 14.

Additional electrodes, commonly called guard rings, such as electrodes 15 and 16 having similar construction as electrode 8 may be provided if desired.

The mating surfaces of the turned back portion 13 and turned back portion 5 are ground or otherwise roughened as at 13A so that a smooth, gas-tight joint is provided between the cylinders 2 and 9. With this construction the electrodes 1 and 8 are securely held in spaced relation.

The terminal pins 3, 10, 17 and 18 provide electrical connections to the electrodes 1, 8, 15 and 16 respectively.

Figure 3 which shows another embodiment of a cell constructed in accordance with this invention is similar to the embodiment of Figure 1 but differs in the manner in which the cylinders are joined. Only those parts of Figure 2 which are different from the parts of Figure 1 will be described.

In Figure 3 the cylinder 2' is provided with a frustro-conical shaped portion 5' and cylinder 9' is provided with a frustro-conical shaped portion 13'. The mating surfaces of portions 5' and 13' are ground or otherwise roughened as at 13A so as to provide a tight joint between the cylinders.

It will be apparent from the drawing and above description that cells constructed in accordance with this invention may be easily disassembled for cleaning and also the invention provides for securely positioning the electrodes in spaced relation.

Cells for measuring liquid dielectrics are commonly placed in a medium having a controlled temperature while the test is being conducted. Cells constructed in accordance with this invention are particularly well suited for such a type of test since a relatively large surface of the liquid under test is in heat exchanging relation with the interior of cylinder 9 and the exterior of cylinder 2.

While specific embodiments of this invention have been shown and described it will be understood that many changes and modifications may be made therein without departing from the spirit and scope of this invention.

What is claimed is:

1. In an apparatus for determining the electrical characteristics of a liquid, a first cylindrical dielectric supporting member having a portion closing one end thereof and the other end having a frustro-conical shape, a second cylindrical dielectric supporting member having a portion closing one end thereof and the other end having a frustro-conical shape, said cylindrical dielectric supporting members having different diameters and different lengths whereby a closed space, defined by the exterior of the cylindrical dielectric supporting member having the smaller dimension and the interior of the cylindrical dielectric supporting member having the larger dimension, is produced when the smaller cylindrical dielectric supporting member is inserted into the larger cylinder, a first electrode supported on the exterior of said cylindrical dielectric supporting member having the smaller dimensions and a second electrode supported on the interior of said cylindrical dielectric supporting member having the larger dimension.

2. In an apparatus for determining the electrical characteristics of a liquid, a first and second cylindrical dielectric supporting members each having an electrode mounted thereon, said supporting members being concentrically arranged, said first and second cylindrical supporting members each being closed at one end and having their other ends joined by frustro-conical shaped portions.

3. An apparatus according to claim 2 wherein said ends are joined by frustro-conical shaped portions having mating surfaces ground to a smooth gas-tight fit.

4. A cell for determining the electrical characteristics of a liquid comprising, a first and second cylindrical dielectric supporting members concentrically arranged and each having one closed end and a frustro-conical shaped opened end, a first cylindrical electrode slidably positioned on the outside of the innermost cylinder supporting member and arrested from movement in one direction by a contact member securely engaging the supporting member and removably engaging said first electrode, a second cylindrical electrode slidably positioned on the inside of the outermost cylindrical supporting member and arrested from movement in one direction by a contact member securely engaging the supporting member and removably engaging said second electrode.

5. A cell according to claim 4 wherein said first cylindrical electrode is provided with a longitudinal groove on its interior surface whereby the electrode may be removed when said groove is aligned with said contact member.

6. In an apparatus for determining the electrical characteristics of a fluid, an electrode and support therefor comprising a cylindrical dielectric supporting member having a contact extending radially therefrom, a cylindrical electrode having a longitudinal groove on the inside thereof slidably engaging the exterior of said supporting member and being arrested from movement in one direction by said contact when said contact is not in line with said groove whereby said electrode may pass longitudinally along said supporting member when said groove and contact are in alignment.

CLIFFORD C. PETERSEN.

References Cited in the file of this patent

UNITED STATES PATENTS

| Number | Name | Date |
|---|---|---|
| 1,719,654 | Eckers | July 2, 1929 |
| 1,774,969 | Grant | Sept. 2, 1930 |
| 1,807,821 | Behr | June 2, 1931 |
| 2,289,687 | Stuart | July 14, 1942 |
| 2,374,499 | Quayle et al. | Apr. 24, 1945 |
| 2,555,937 | Rosenthal et al. | June 5, 1951 |